Oct. 1, 1957 K. L. NEUMANN ET AL 2,808,504

SINGLE SIDEBAND TRANSMITTING AND RECEIVING UNIT

Filed March 22, 1955 2 Sheets-Sheet 1

INVENTORS
KARL L. NEUMANN
NILES L. BARLOW
BY & CHARLES E. SCHNEIDER

Charles H. Brown
ATTORNEY

Oct. 1, 1957 K. L. NEUMANN ET AL 2,808,504

SINGLE SIDEBAND TRANSMITTING AND RECEIVING UNIT

Filed March 22, 1955

2 Sheets-Sheet 2

INVENTORS
KARL L. NEUMANN
NILES L. BARLOW
& CHARLES E. SCHNEIDER
BY
Charles H. Brown
ATTORNEY United States Patent Office 2,808,504
Patented Oct. 1, 1957

2,808,504

SINGLE SIDEBAND TRANSMITTING AND RECEIVING UNIT

Karl L. Neumann, Yonkers, and Niles L. Barlow, Pearl River, N. Y., and Charles E. Schneider, Elberon, N. J., assignors to Radio Corporation of America, a corporation of Delaware Application March 22, 1955, Serial No. 495,878

11 Claims. (Cl. 250—13)

This invention relates to a single sideband radio transmitting and receiving unit (transceiver).

The invention is particularly useful for voice or Morse code communication between units of police, military and marine organizations employing radio frequencies in the region of about 3 to 15 megacycles.

It has been customary in radio communications to transmit the radio frequency carrier with both sidebands. It is known that the intelligence can be transmitted in the form of one sideband only and can be received by adding the carrier at the receiver. The increasing congestion in the radio frequency spectrum favors the use of single sideband signals which require only one-half the spectrum space of conventional double sideband signals. The use of single sideband equipment has been limited because of the complexity and expense of single sideband equipment. It is therefore a general object of this invention to provide a simple and highly effective single sideband transmitting and receiving unit.

It is another object to provide an improved single sideband transmitting and receiving unit which may be operated at any frequency in a large range by appropriately selecting the frequency of one of a plurality of piezoelectric crystals.

It is another object to provide an improved transmitting and receiving unit wherein the same frequency is used for transmitting and receiving so that the proper tuning of communicating units is assured.

It is a further object to provide an improved single sideband transmitting and receiving unit which can communicate with conventional units employing a carrier and double sidebands.

It is still a further object to provide an improved transmitting and receiving unit wherein the receiving portion is extremely effective in rejecting adjacent channel interference and noise.

In one aspect, the invention comprises three crystal oscillators of progressively higher frequency used in common by the transmitter portion and the receiver portion of the unit. The transmitter portion includes three balanced modulators receptive respectively of the outputs of the three oscillators. An audio frequency signal is applied to the first balanced modulator and one sideband in the output is selected by a mechanical filter for application to the second modulator. The output of the second modulator is tuned to pass the sum frequencies to the input of the third modulator, and the output of the third modulator is tuned to pass the difference frequencies to radio frequency amplifiers and the antenna. In the receiver portion, the received signal is mixed with the output of the third oscillator and the difference frequencies are passed and mixed with the output of the second oscillator. The resulting difference frequencies are passed through a mechanical filter to an amplifier and demodulator also receptive of the output of the first oscillator.

These and other objects and aspects of the invention will be apparent to those skilled in the art from the following more detailed description taken in conjunction with the appended drawings, wherein.

Figures 1, 2:
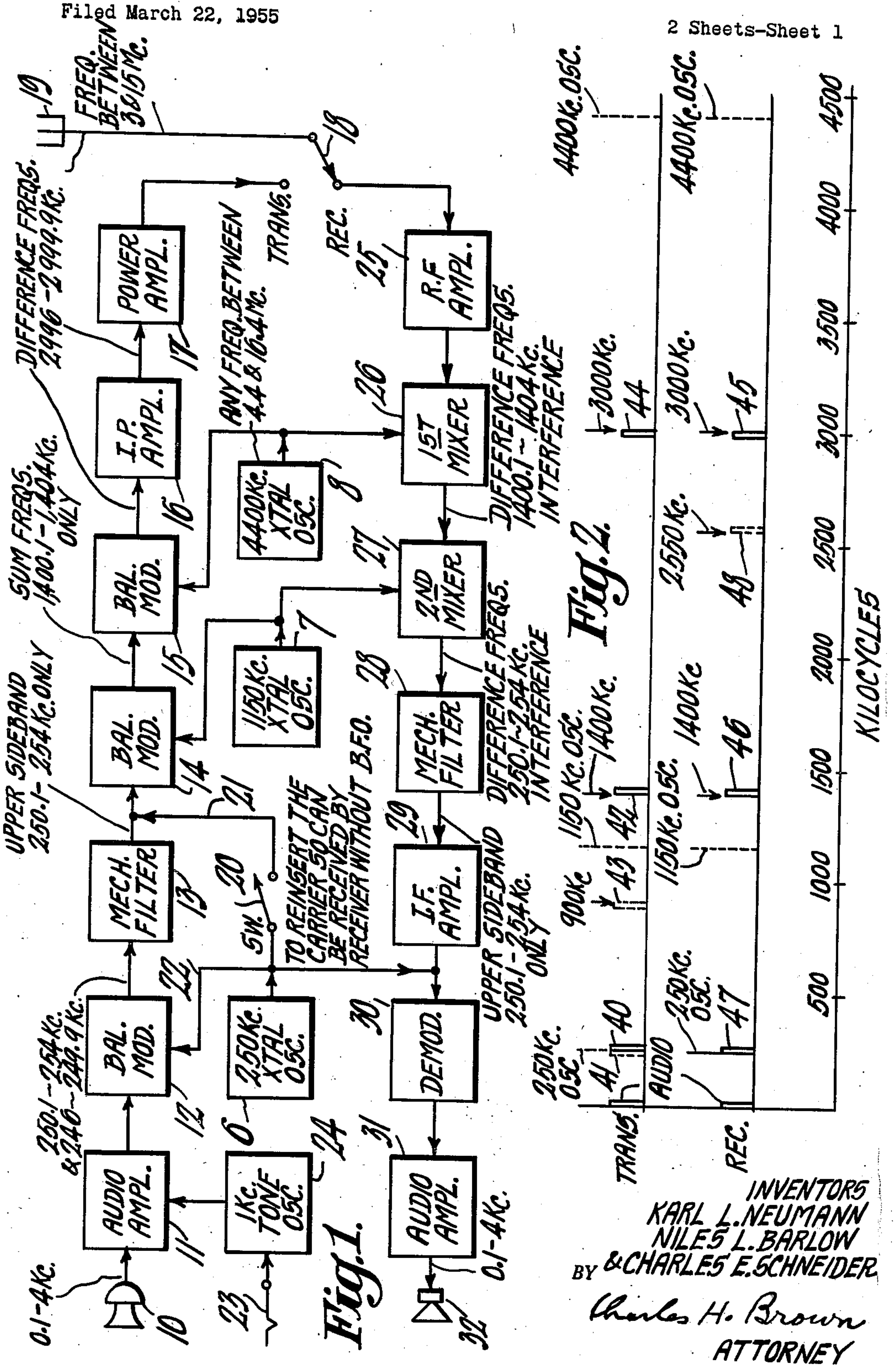
Figure 1 is a block diagram of a single sideband transmitting and receiving unit constructed according to the teachings of this invention.
Figure 2 is a chart showing signal frequencies at various points in the transmitting and receiving unit of Figure 1, the specific frequency values being merely by way of illustration.
Figure 3:
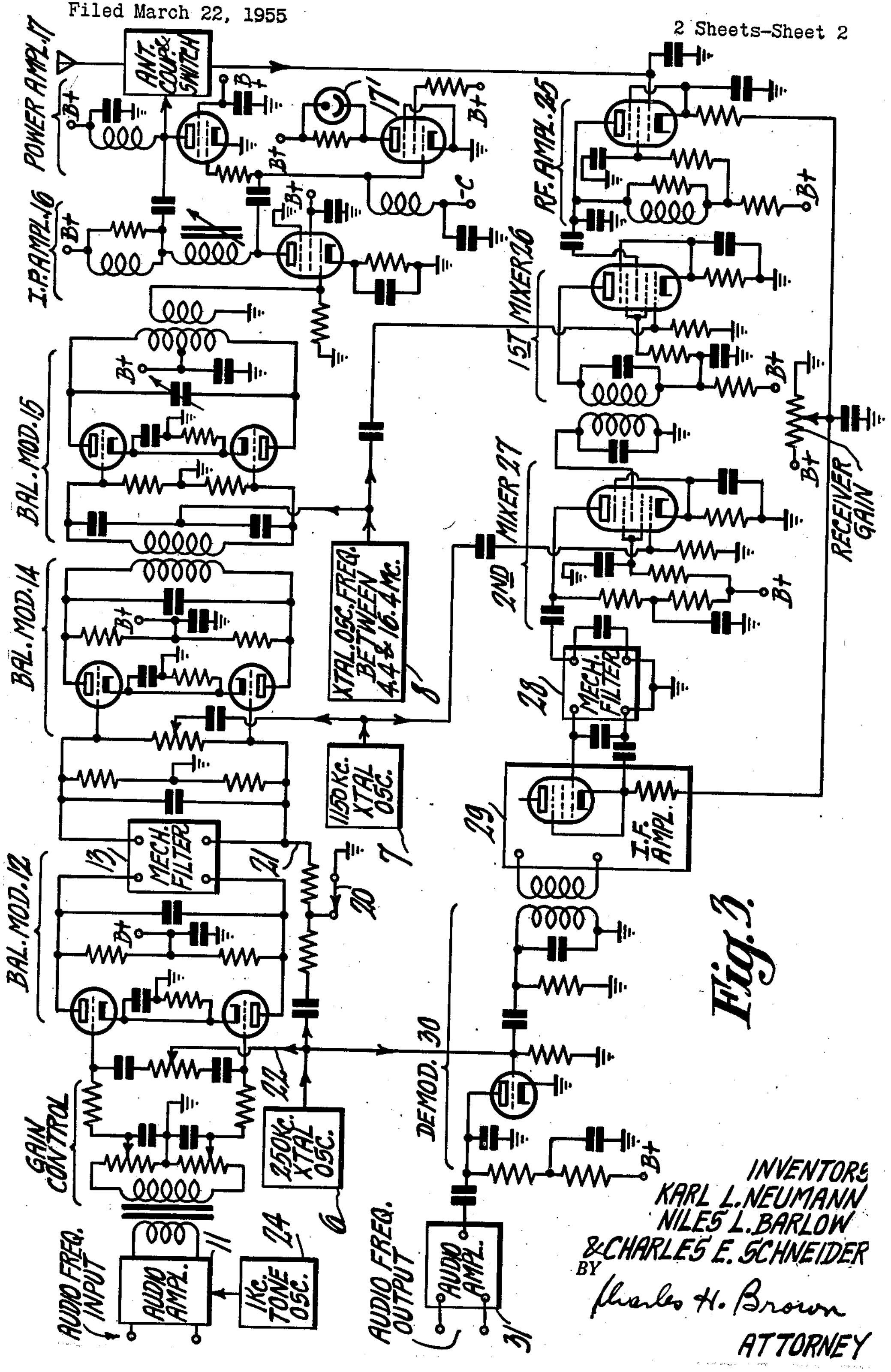
Figure 3 is a detailed circuit diagram of the unit shown in block form in Figure 1.

Figures 1 and 3 show a single sideband transmitting and receiving unit including a first crystal oscillator 6 having a frequency of 250 kilocycles, a second crystal oscillator 7 having a frequency of 1150 kilocycles, and a third crystal oscillator 8 having a frequency of 4400 kilocycles. It will be understood that the specific values of frequencies are referred to solely by way of example to facilitate a ready understanding of the invention. If the transmitted and received radio signal is to be between 3 and 15 megacycles, the crystal oscillator 8 should have an appropriate frequency in the range between 4.4 and 16.4 megacycles. The frequency of the oscillator 8 is higher than the transmitted or received frequency.

The transmitter portion of the unit includes a microphone 10 coupled to an audio amplifier 11. A first balanced modulator 12 receives the output of the audio amplifier 11 and the output of the first crystal oscillator 6. The signal from the audio amplifier 11 is applied in push-pull to the balanced modulator 12, and the output of the oscillator 6 is applied in parallel to the balanced modulator 12, so that the output of the balanced modulator 12 includes the upper and lower sidebands but does not include a signal at the frequency of the oscillator 6, 250 kilocycles in the present example. The output of the balanced modulator 12 is applied to a magnetostrictive mechanical filter 13 which is designed to pass only one of the sidebands from the balanced modulator 12. In the present example, the mechanical filter 13 is designed to pass the upper sideband only.

A second balanced modulator 14 is receptive of the upper sideband from the mechanical filter 13 applied in push-pull, and is receptive of the output of the second crystal oscillator 7 applied in parallel. The sum and difference frequencies produced in the balanced modulator 14 are separated in frequency by about twice the frequency of the first oscillator 6. In the present example, the sum and difference frequencies are separated by about 500 kilocycles so that it is relatively easy to tune the output circuit of the balanced modulator 14 to pass only the sum frequencies. In the present example, the sum frequencies ocupy an audio frequency range immediately above 1400 kilocycles, 1400 kilocycles being the sum of the frequencies of the first and second oscillators 6 and 7, respectively.

A third balanced modulator 15 receives the sum frequencies in push-pull from the second balanced modulator 14 and receives the output of the third crystal oscillator 8 in parallel. The sum and difference frequencies produced in the balanced modulator 15 are very widely spaced in frequency and the difference frequencies only are passed by the tuned output circuit of the balanced modulator 15. The frequency of the third oscillator 8 is selected to be sufficiently high so that the difference frequencies resulting from the mixing action in the balanced moduator 15 provide the desired output radio frequency of the transmitter. The difference frequencies from the balanced modulator 15 are amplified in an intermediate power amplifier 16 and a power amplifier 17, and then are applied through a transmit-receive switch 18 to an antenna 19. A glow tube 17' in a modulation indicator circuit provides a visual indication of the degree of modulation.

Following the example given, if it is desired to transmit a radio frequency at 3000 kilocycles, the frequency of the third oscillator 8 is selected to have a value of 4400 kilocycles. If it is desired to transmit a radio frequency at a frequency of 15,000 kilocycles, the frequency of oscillator 8 is set at 16,400 kilocycles. The frequency of oscillator 8 is similarly selected to provide other output frequencies between 3000 and 15,000 kilocycles (between 3 and 15 megacycles). The frequency of the third oscillator 8 is selected to have a value equal to the desired transmitter output frequency plus the sum of the frequencies of the first and second oscillators 6 and 7, respectively. Output frequencies can be quickly changed over a considerable range by merely substituting one piezoelectric crystal for another in the third oscillator 8.

A switch 20 and a lead 21 connect the output of the first oscillator 6 to the signal input of the second balanced modulator 14. Normally, the 250 kilocycle signal from the first crystal oscillator 6 applied over the lead 22 to the first balanced modulator 12 is eliminated by the balancing action of the modulator 12 and the mechanical filter 13 before reaching the second balanced modulator 14. By means of the switch 20 and the lead 21, the 250 kilocycle signal from the first oscillator 6 may be reinserted in the transmitting portion of the unit at a point following the mechanical filter 13. The 250 kilocycle signal is combined with the upper sideband from the mechanical filter 13 and both are heterodyned together in the second and third balanced modulators 14 and 15 so that the transmitted signal includes a radio frequency carrier and a closely adjacent lower sideband. This signal may be received and understood by conventional receivers not having a beat frequency oscillator therein.

As an alternative to the microphone input, a telegraph key 23 controls a one-kilocycle tone oscillator 24, the output of which is applied to the audio amplifier 11. When the key 23 is depressed and the output of the one-kilocycle tone oscillator 24 is applied to the audio amplifier 11, the upper and lower sidebands in the output of the balanced modulator 12 consist of single frequencies 1 kilocycle removed from the frequency of the first oscillator 6. Following the mechanical filter 13, only a single frequency exists in the system, and only a single frequency is transmitted from the antenna 19. Of course, if at the same time, the output of the first oscillator 6 is applied through switch 20 and lead 21 to the balanced modulator 14, a carrier frequency also exists in the system and the transmitted signal consists of a carrier with one sideband constituted by a frequency 1 kilocycle removed from the carrier. This form of transmission is known as modulated continuous wave transmission.

The receiver portion of the transmitting-receiving unit includes a radio frequency amplifier 25 which derives an input from the antenna 19 through switch 18. The output of the radio frequency amplifier 25 is applied to a first mixer 26 which also receives output from the third oscillator 8. A tuned circuit in the output of the first mixer 26 passes the difference frequencies to the input of a second mixer 27 which is also receptive of the output of the second oscillator 7. The difference frequencies in the output of the second mixer 27 are applied to a second mechanical filter 28 which may be identical to filter 13 in the transmitter portion of the unit. The mechanical filter 28 eliminates adjacent frequency interference and noise and passes the difference frequencies on to an intermediate frequency amplifier 29. The output of the intermediate frequency amplifier 29 is applied, together with the output of the first oscillator 6, to a demodulator 30. The output of the demodulator 30 is an audio signal which is amplified in an audio amplifier 31 and applied to a speaker 32.

Normally, when receiving a single sideband signal, such as from the transmitter portion of a similar distant transmitting-receiving unit, the mechanical filter 28 serves to eliminate nearby interference and noise. On the other hand, when receiving a conventional signal with carrier and two sidebands, the mechanical filter 28 rejects the carrier and one of the sidebands. In order to derive the audio frequency intelligence from the single sideband in the demodulator 30, it is necessary to have a carrier frequency signal and this is supplied by the first crystal oscillator 6. It is therefore apparent that the receiver portion of the unit can receive and demodulate either single sideband signals or conventional signals, without any readjustment in the equipment.

Figure 2 is a chart showing frequencies existing in the transmitting and receiving portions of the unit. The main useful frequencies are shown by solid lines and the auxiliary or rejected frequencies are shown by dotted lines. No attempt is made to show relative amplitudes. The chart of transmitting frequencies shows the band of audio frequencies which may extend from 100 cycles to 4000 cycles. The frequencies of the three crystal oscillators 6, 7 and 8 in Figures 1 and 3 are shown at values of 250 kilocycles, 1150 kilocycles and 4400 kilocycles, respectively, following the example heretofore given. In the first balanced modulator 12, the 250 kilocycle signal is modulated by the audio input signal to provide an upper sideband 40 and a lower sideband 41. Only the upper sideband 40 is passed by the output circuit of the first balanced modulator 12 and the mechanical filter 13. The second balanced modulator 14 mixes the 1150 kilocycle signal with the upper sideband 40 to provide sum frequencies 42 and difference frequencies 43. Only the sum frequencies 42 are passed by the tuned output circuit of the second balanced modulator 14. The third balanced modulator 15 mixes the 4400 kilocycle signal with the sum frequencies 42 to provide difference frequencies 44 and sum frequencies near 7400 kilocycles (not shown) off the scale of the drawing. The lower sideband or the difference frequencies 44 are amplified and applied to the antenna 19.

Referring to the receiving portion of the chart of Figure 2, a received single sideband signal is represented at 45. The received signal 45 is mixed in the first mixer 26 with the 4400 kilocycle signal from the third oscillator 8 to provide a difference frequency signal 46 and a sum frequency signal off the right edge of the chart. The sum and difference frequencies are widely separated in frequency and the output circuit of the first mixer 26 is easily designed to pass only the difference frequencies 46. The difference frequencies 46 are mixed with the 1150 kilocycle signal from the output of the second oscillator 7 to provide difference frequencies 47 and sum frequencies 48. Only the difference frequencies 47 are passed by the output circuit of the second mixer 27 and the mechanical filter 28. The difference frequencies 47 are combined with the 250 kilocycle signal from the first oscillator 6 in the demodulator 30 to provide the audio frequency signal which is applied to the speaker 32.

The frequency of the third crystal oscillator 8 has been illustrated as having a value of 4400 kilocycles. This third oscillator may, for example, have a frequency of 5400 kilocycles, in which case the difference frequencies 44 and 45 will be located immediately below 4000 kilocycles. The other frequencies in the transmitting and receiving portions are unaffected by this change since the difference between the signals 44 and 45 and the frequency of the third oscillator 8 remains the same, i. e. 1400 kilocycles. It is thus apparent that in order to change the tuning of the unit, it is only necessary to change the frequency of the third crystal oscillator 8, as by changing the piezoelectric crystal therein.

It has been found that by using a third crystal oscillator 8 having a frequency higher than the frequency which it is desired to transmit and receive, there is a great reduction in the interference encountered between various circuits in the transmitter-receiver unit. Stated another way, the transmitting-receiving unit can be more economically constructed by reason of not requiring so much attention to shielding and the use of highly frequency sensitive circuits.

According to the invention the transmitting frequency is the same as the receiving frequency and is determined by the frequency of the third crystal oscillator 8. By this arrangement, communication is facilitated between two distant similar transmitting-receiving units. If the receiver portion of a local transmitting-receiving unit is tuned to receive a signal from a distant transmitting-receiving unit, the transmitting portion of the local unit is automatically tuned to the same frequency, and vice versa. This greatly simplifies the operational procedures.

According to this invention the advantages of single sideband operation are achieved in equipment which is relatively simple, inexpensive, and easily operated by unskilled persons. The transmitter-receiver unit of this invention is very versatile in operation in that it can provide communication with either similar single sideband units or conventional transmitters and receivers employing a carrier and two sidebands or a vestigial sideband signal, or a carrier and single sideband signal.

What is claimed is:

1. A single sideband transmitting and receiving unit comprising: first, second, and third crystal oscillators of progressively higher frequencies; a transmitting portion includnig a first modulator having an input coupled to the output of said first oscillator and having an input for an audio frequency signal, a first mechanical filter having an input coupled to the output of said first modulator and adapted to pass only one sideband in the output of said modulator, a second modulator having one input coupled to the output of said second oscillator and having another input coupled to the output of said mechanical filter and having an output circuit tuned to pass only the sum frequencies, and a third modulator having one input coupled to the output of said third oscillator and another input coupled to the output of said second modulator and having an output circuit tuned to pass only the difference frequencies; and a receiving portion including a first mixer having one input coupled to the output of said third oscillator and another input receptive of a received radio frequency signal and having an output circuit tuned to pass only the difference frequencies, a second mixer having one input coupled to the output of said second oscillator and another input coupled to the output of said first mixer, a second mechanical filter having an input coupled to the output of said second mixer and adapted to pass only the difference frequencies constituting one sideband with relation to a hypothetical carrier having the frequency of said first oscillator, and a demodulator having an input coupled to the output of said first oscillator and to the output of said second filter, whereby an audio frequency signal is obtained from said demodulator.

2. A single sideband transmitting and receiving unit comprising: first, second, and third crystal oscillators of progressively higher frequencies; a transmitting portion including a first balanced modulator having an input coupled to the output of said first oscillator and having an input for an audio frequency signal, a first mechanical filter having an input coupled to the output of said first balanced modulator and adapted to pass only one sideband in the output of said modulator, a second balanced modulator having one input coupled to the output of said second oscillator and having another input coupled to the output of said mechanical filter and having an output circuit tuned to pass only the sum frequencies, and a third balanced modulator having one input coupled to the output of said third oscillator and another input coupled to the output of said second balanced modulator and having an output circuit tuned to pass only the difference frequencies; and a receiving portion including a first mixer having one input coupled to the output of said third oscillator and another input receptive of a received radio frequency signal and having an output circuit tuned to pass only the difference frequencies, a second mixer having one input coupled to the output of said second oscillator and another input coupled to the output of said first mixer, a second mechanical filter having an input coupled to the output of said second mixer and adapted to pass only the difference frequencies constituting one sideband with relation to a hypothetical carrier having the frequency of said first oscillator, and a demodulator having an input coupled to the output of said first oscillator and to the output of said second filter, whereby an audio frequency signal is obtained from said demodulator.

3. A single sideband transmitting and receiving unit comprising: first, second, and third crystal oscillators of progressively higher frequencies, said third crystal oscillator having a frequency higher than the frequency of the transmitted and received signal; a transmitting portion including a first audio amplifier coupled to amplify an audio frequency signal, a first balanced modulator having an input coupled to the output of said first oscillator and having an input coupled to the output of said audio amplifier, a first mechanical filter having an input coupled to the output of said first modulator and adapted to pass only one sideband in the output of said modulator, a second balanced modulator having one input coupled to the output of said second oscillator and having another input coupled to the output of said mechanical filter and having an output circuit tuned to pass only the sum frequencies, a third balanced modulator having one input coupled to the output of said third oscillator and another input coupled to the output of said second modulator and having an output circuit tuned to pass only the difference frequencies, and means to amplify the output of said third modulator to provide a signal for radiation to a distant point; and a receiving portion including a radio frequency amplifier for amplifying a received signal, a first mixer having one input coupled to the output of said third oscillator and another input coupled to the output of said radio frequency amplifier and having an output circuit tuned to pass only the difference frequencies, a second mixer having one input coupled to the output of said second oscillator and another input coupled to the output of said first mixer, a second mechanical filter having an input coupled to the output of said second mixer and adapted to pass only the frequencies constituting one sideband with relation to a hypothetical carrier having the frequency of said first oscillator, an intermediate frequency amplifier having an input coupled to the output of said second filter, a demodulator having an input coupled to the output of said first oscillator and to the output of said intermediate frequency amplifier, and an audio amplifier coupled to amplify the audio output of said demodulator.

4. A single sideband transmitting and receiving unit as defined in claim 3, and in addition, means including a switch to couple the output of said first oscillator to an input of said second modulator.

5. A single sideband transmitting and receiving unit as defined in claim 3, and in addition, an audio frequency tone oscillator having an output coupled to an input of said first audio amplifier.

6. A single sideband transmitting and receiving unit comprising: first, second, and third crystal oscillators of progressively higher frequencies, said third crystal oscillator having a frequency higher than the frequency of the transmitted and received signal; a transmitting portion including a first balanced modulator having an input coupled to the output of said first oscillator and having an input for an audio frequency signal, a first mechanical filter having an input coupled to the output of said first modulator and adapted to pass only the upper sideband in the output of said modulator, a second balanced modulator having one input coupled to the output of said second oscillator and having another input coupled to the output of said mechanical filter and having an output circuit tuned to pass only the sum frequencies, a third balanced modulator having one input coupled to the output of said third oscillator and another input coupled to the output of said second modulator and having an output circuit tuned to pass only the difference frequencies, and means to amplify the output of said third modulator to provide a signal for radiation to a distant point; and a receiving portion including a radio frequency amplifier for amplifying a received signal, a first mixer having one input coupled to the output of said third oscillator and another input coupled to the output of said radio frequency amplifier and having an output circuit tuned to pass only the difference frequencies, a second mixer having one input coupled to the output of said second oscillator and another input coupled to the output of said first mixer, a second mechanical filter having an input coupled to the output of said second mixer and adapted to pass only the difference frequencies constituting the upper sideband with relation to a hypothetical carrier having the frequency of said first oscillator, an intermediate frequency amplifier having an input coupled to the output of said second filter, a demodulator having an input coupled to the output of said first oscillator and to the output of said intermediate frequency amplifier, and an audio amplifier coupled to amplify the audio output of said demodulator.

7. A single sideband transmitting and receiving unit comprising: first, second, and third crystal oscillators of progressively higher frequencies, said third crystal oscillator having a frequency higher than the frequency of the transmitted and received signals; a transmitting portion including a first audio amplifier, a first balanced modulator having an input coupled to the output of said first oscillator and having an input coupled to the output of said audio amplifier, a first mechanical filter having an input coupled to the output of said first modulator and adapted to pass only the upper sideband in the output of said modulator, a second balanced modulator having one input coupled to the output of said second oscillator and having another input coupled to the output of said mechanical filter and having an output circuit tuned to pass only the sum frequencies, a third balanced modulator having one input coupled to the output of said third oscillator and another input coupled to the output of said second modulator and having an output circuit tuned to pass only the difference frequencies, and means to amplify the output of said third modulator to provide a signal for radiation to a distant point; and a receiving portion including a radio frequency amplifier for amplifying a received signal, a first mixer having an input coupled to the output of said third oscillator and another input coupled to the output of said radio frequency amplifier and having an output circuit tuned to pass only the difference frequencies, a second mixer having one input coupled to the output of said second oscillator and another input coupled to the output of said first mixer, a second mechanical filter having an input coupled to the output of said second mixer and adapted to pass only the difference frequencies constituting the upper side band with relation to a hypothetical carrier having the frequency of said first oscillator, an intermediate frequency amplifier having an input coupled to the output of said second filter, a demodulator having an input coupled to the output of said first oscillator and to the output of said intermediate frequency amplifier, and a second audio frequency amplifier coupled to amplify the audio output of said demodulator.

8. A single sideband transmitting and receiving unit comprising: first and second preset and third adjustable crystal oscillators of progressively higher frequencies, said third oscillator being selectively adjustable to provide different operating frequencies; a transmitting portion including a first modulator having an input coupled to the output of said first oscillator and having an input for an audio frequency signal, a first filter having an input coupled to the output of said first modulator and adapted to pass only one sideband in the output of said modulator, a second modulator having one input coupled to the output of said second oscillator and having another input coupled to the output of said filter and having an output circuit tuned to pass only the sum frequencies, a third modulator having one input coupled to the output of said third oscillator and another input coupled to the output of said second modulator and having an output circuit tuned to pass only the difference frequencies, and an antenna coupled to the output of said third modulator; and a receiving portion including a first mixer having one input coupled to the output of said third oscillator and another input adapted to be coupled to said antenna for receiving a radio frequency signal and having an output circuit tuned to pass only the difference frequencies, a second mixer having one input coupled to the output of said second oscillator and another input coupled to the output of said first mixer, a second filter having an input coupled to the output of said second mixer and adapted to pass only the difference frequencies constituting one sideband with relation to a hypothetical carrier having the frequency of said first oscillator, and a demodulator having an input coupled to the output of said first oscillator and to the output of said second filter, whereby an audio frequency signal is obtained from said demodulator.

9. A single sideband transmitting and receiving unit comprising: first, second, and third crystal oscillators of progressively higher frequencies; a transmitting portion including a first modulator having an input coupled to the output of said first oscillator and having an input for an audio frequency signal, a first mechanical filter having an input coupled to the output of said first modulator and adapted to pass only one sideband in the output of said modulator, a second modulator having one input coupled to the output of said second oscillator and having another input coupled to the output of said mechanical filter and having an output circuit tuned to pass only the sum frequencies, means including a switch for supplying oscillations from the output of said first oscillator to an input of said second modulator, a third modulator having one input coupled to the output of said third oscillator and another input coupled to the output of said second modulator and having an output circuit tuned to pass only the difference frequencies, and an antenna coupled to the output of said third modulator; and a receiving portion including a first mixer having one input coupled to the output of said third oscillator and another input adapted to be coupled to said antenna for receiving a radio frequency signal and having an output circuit tuned to pass only the difference frequencies, a second mixer having one input coupled to the output of said second oscillator and another input coupled to the output of said first mixer, a second mechanical filter having an input coupled to the output of said second mixer and adapted to pass only the difference frequencies constituting one sideband with relation to a hypothetical carrier having the frequency of said first oscillator, and a demodulator having an input coupled to the output of said first oscillator and to the output of said second filter, whereby an audio frequency signal is obtained from said demodulator.

10. A single sideband transmitting and receiving unit comprising: first, second, and third crystal oscillators of progressively higher frequencies, said third oscillator being selectively adjustable to provide different operating frequencies; a transmitting portion including a first modulator having an input coupled to the output of said first oscillator and having an input for an audio frequency signal, a first filter having an input coupled to the output of said first modulator and adapted to pass only one sideband in the output of said modulator, a second modulator having one input coupled to the output of said second oscillator and having another input coupled to the output of said filter and having an output circuit tuned to pass only a single sideband, a third modulator having one input coupled to the output of said third oscillator and another input coupled to the output of said second modulator and having an output circuit tuned to pass only a single sideband, an amplifier coupled to the output of said third modulator, an antenna for radiating a signal obtained from said amplifier, and means including a switch for supplying oscillations from the output of said first oscillator to an input of said second modulator, whereby a carrier frequency can be transmitted along with one sideband of the signal radiated by said antenna; and a receiving portion including a first mixer having one input coupled to the output of said third oscillator and another input adapted to be coupled to said antenna and having an output circuit tuned to pass only a single sideband, a second mixer having one input coupled to the output of said second oscillator and another input coupled to the output of said first mixer, a second filter having an input coupled to the output of said second mixer and adapted to pass only frequencies constituting one sideband with relation to a hypothetical carrier having the frequency of said first oscillator, and a demodulator having an input coupled to the output of said first oscillator and to the output of said second filter, whereby an audio frequency signal is obtained from said demodulator.

11. An amplitude modulation single sideband transmitting and receiving system comprising: an antenna; an antenna switch for alternately connecting said antenna to a transmitting terminal of the switch and a receiving terminal of the switch; first, second, and third crystal oscillators of progressively higher frequencies; a transmitting portion including a first modulator having an input coupled to the output of said first oscillator and having an input for an audio frequency signal, a first filter having an input coupled to the output of said first modulator and adapted to pass only one sideband in the output of said modulator, a second modulator having one input coupled to the output of said second oscillator and having another input coupled to the output of said first filter and having an output circuit tuned to pass only a single sideband, a third modulator having one input coupled to the output of said third oscillator and another input coupled to the output of said second modulator and having an output circuit tuned to pass only a single sideband, an amplifier coupled to the output of said third modulator, and a coupling from the output of said amplifier to the transmitting terminal of said antenna switch; and a receiving portion including a first mixer having one input coupled to the output of said third oscillator and another input coupled to the receiving terminal of said antenna switch and having an output circuit tuned to pass only a single sideband, a second mixer having one input coupled to the output of said second oscillator and another input coupled to the output of said first mixer, a second filter having an input coupled to the output of said second mixer and adapted to pass only frequencies constituting one sideband with relation to a hypothetical carrier having the frequency of said first oscillator, and a demodulator having an input coupled to the output of said first oscillator and to the output of said second filter, whereby an audio frequency signal is obtained from said demodulator.

References Cited in the file of this patent

UNITED STATES PATENTS

| | | |
|---|---|---|
| 2,272,068 | Pollack | Feb. 3, 1942 |
| 2,408,826 | Vogel | Oct. 8, 1946 |
| 2,499,279 | Peterson | Feb. 28, 1950 |
| 2,529,443 | Bach | Nov. 7, 1950 |
| 2,608,648 | Magnuski | Aug. 26, 1952 |
| 2,666,133 | Kahn | Jan. 12, 1954 |
| 2,708,237 | Roberts | May 10, 1955 |